AUTOMATIC FREQUENCY CONTROL
Filed July 15, 1950 2 Sheets-Sheet 1
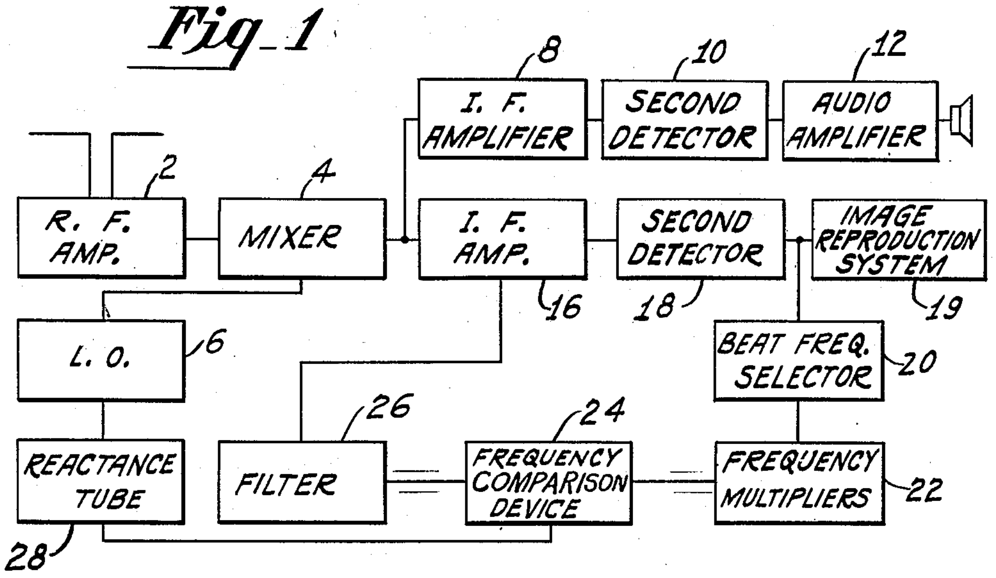
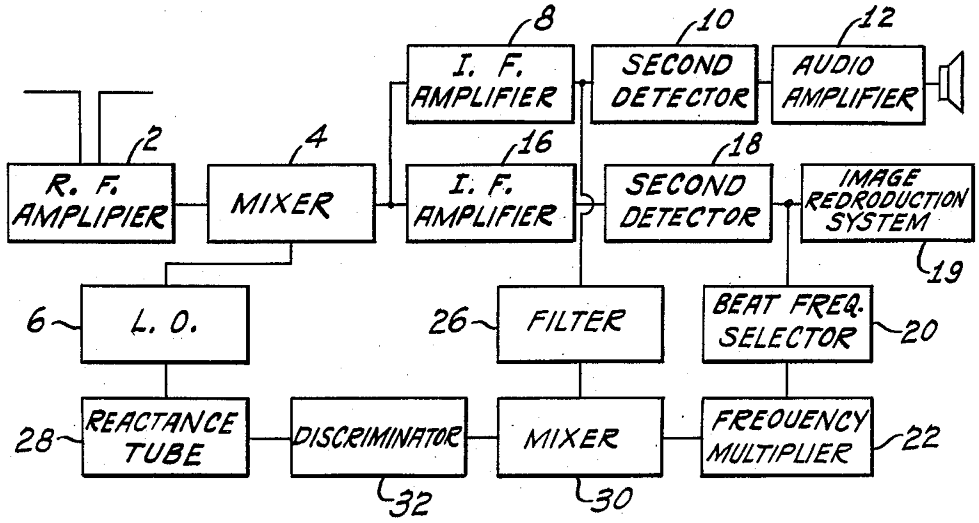
Fig_2
INVENTOR
Gordon F. Rogers
ATTORNEY

AUTOMATIC FREQUENCY CONTROL

Filed July 15, 1950 2 Sheets-Sheet 2

INVENTOR
Gordon F. Rogers
BY
ATTORNEY

Patented Apr. 27, 1954 2,677,049

UNITED STATES PATENT OFFICE 2,677,049

AUTOMATIC FREQUENCY CONTROL

Gordon F. Rogers, North Hollywood, Calif., assignor to Radio Corporation of America, a corporation of Delaware Application July 15, 1950, Serial No. 173,981

5 Claims. (Cl. 250—20)

Figures 3, 4, 5:
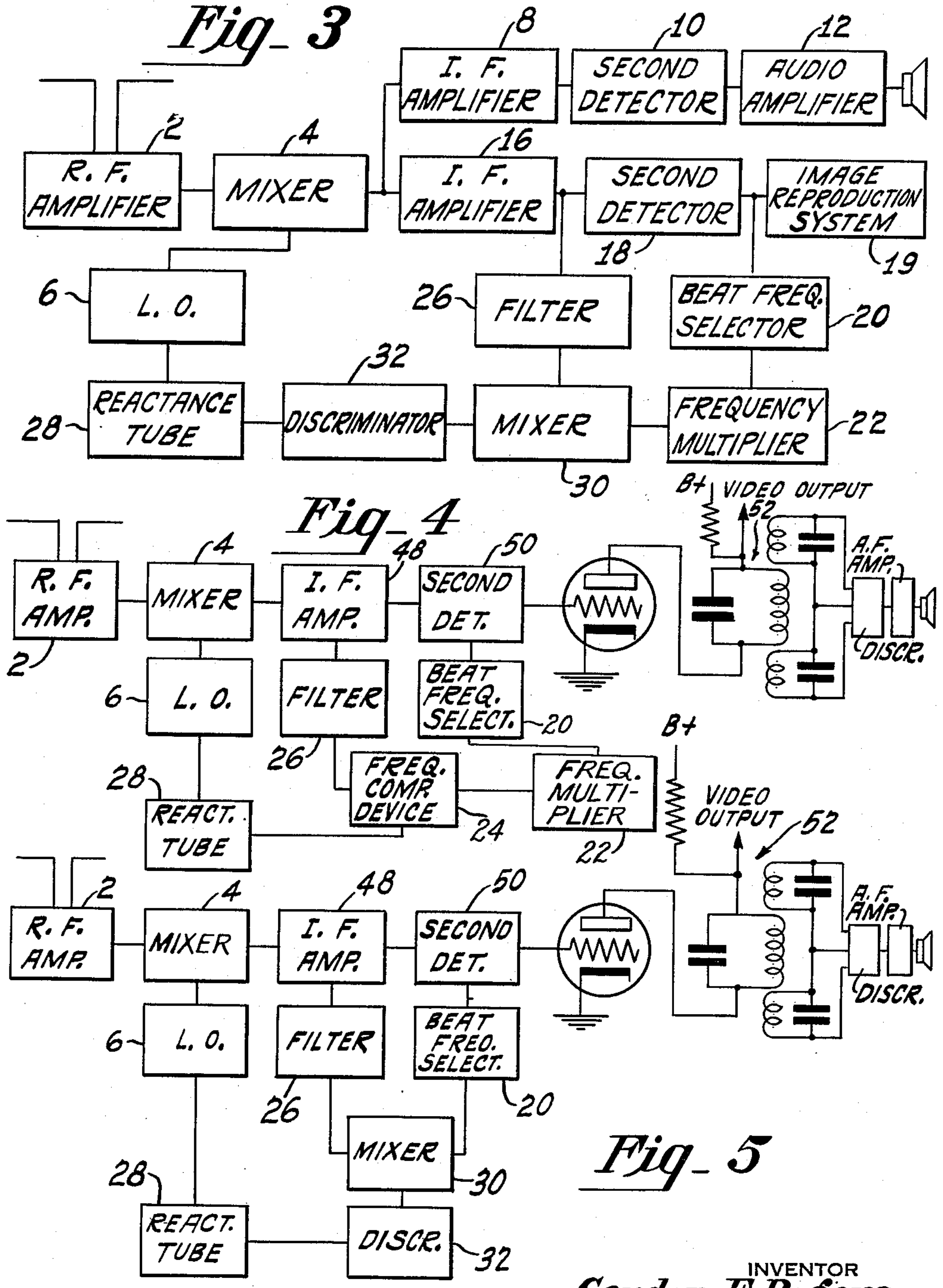

This invention relates to apparatus for controlling the frequency of a local oscillator in a receiver wherein at least two carrier frequencies are available.

Automatic frequency control systems have been devised which depend upon the frequency of the intermediate frequency signal. However, for various reasons, it is desirable that the frequency of the local oscillator in the receiver be controlled in accordance with a standard frequency. In a television receiver that is built in accordance with present day standards, the difference between the received video and sound carriers is always 4½ mc., and therefore it can be employed as a standard frequency.

It is therefore an object of this invention to provide an improved means for controlling the frequency of a local oscillator in accordance with the beat frequency between two carriers.

This and other objects will become apparent from a detailed consideration of the drawings in which:

Figure 1 illustrates a television receiver embodying the principles of this invention wherein the video intermediate frequency carrier is compared with a multiple of the beat frequencies between two I. F. carriers in a frequency comparison device. The output of the frequency comparison device is employed to control the frequency of the local oscillator;

The receiver shown in Figure 2 is similar to that of Figure 1, except that the intermediate frequency sound carrier and the beat frequency between the two intermediate frequency carriers are employed. They are applied to a mixer the output of which is employed to control the frequency of the local oscillator;

Figure 3 illustrates a receiver in which the video intermediate frequency and a multiple of the beat frequency supplied by the video second detector are employed to control the frequency of the local oscillator in the same way as was used in the apparatus of Figure 2;

Figure 4 illustrates the application of the principles of this invention to a television receiver of the inter-carrier sound type. One of the intermediate frequency carriers is compared with the beat frequency supplied by the second detector in a manner similar to that shown in Figure 1; and Figure 5 illustrates the application of the principles of this invention to an intercarrier sound television receiver wherein one of the intermediate frequency carriers and the beat frequency between the two intermediate frequency carriers are both applied to a mixer. The output of the mixer is employed to control the frequency of the local oscillator in a manner similar to that shown in Figure 2.

Referring in detail to Figure 1, a radio frequency amplifier 2 supplies both the audio and video radio frequency carriers to a mixer 4. In accordance with present day standards, these carriers are separated by 4½ mc. The output of a local oscillator 6 is coupled to the mixer 4 and the beat frequencies produced by the heterodyning action within the mixer 4 includes the video I. F. carrier and the sound I. F. carrier. The sound I. F. carrier is amplified in an I. F. amplifier 8 and the audio signals are extracted by a second detector 10. The audio signals thus are amplified in an audio amplifier 12 and applied to a speaker. The video I. F. carrier is amplified in an I. F. amplifier 16. After being detected by a second detector 18 the video signal is applied to any suitable image reproduction system 19.

The video I. F. amplifier 16 does not completely attenuate the sound I. F. carrier and therefore it, too, gets through to the second detector 18. No special circuitry need be provided to achieve this result, as it is a characteristic of most television receivers in existence today. The beat frequency between the two sound I. F. carriers detected in the second detector 18 is selected by a beat frequency selector 20 which may be a narrow pass band filter. After being multiplied in a frequency multiplier 22 it is applied to a frequency comparison device 24. The video I. F. frequency is selected by a narrow pass band filter 26 and is also applied to the comparison device 24. The frequency comparison device 24 may be similar to those described in the U. S. Patent 2,044,749 filed on December 10, 1932 in the name of G. L. Usselman or in the U. S. Patent 2,380,947 filed May 14, 1941 in the name of M. G. Crosby. In either case, the frequency comparison device 24 provides a voltage whose polarity depends upon the direction of departure of one of the frequencies from the other. The 4.5 mc. beat frequency between the two I. F. carriers serves as a standard frequency with which the I. F. carrier is compared. The video I. F. carrier is harmonically related to 4½ mc. if the multiplier 22 is an harmonic multiplier. The output of the comparison device 24 is applied to a means for controlling the frequency of the local oscillator 6. This means may be comprised of a reactance tube 28.

In most present day television receivers the video I. F. frequency is 25.75 mc. If the sixth harmonic of the 4.5 mc. beat note is employed, the video I. F. frequency would be 27.0 mc. It has been recently proposed that the picture I. F. frequencies be 45.75 mc. Under these conditions, the tenth harmonic of the 4.5 mc. beat note could be employed with the result that the I. F. fre-frequency would have to be 4.5 mc.

Figure 2 illustrates a television receiver in which the local oscillator is controlled in accordance with the principles of this invention. For purposes of simplicity, those components that perform similar functions to the ones described in connection with Figure 1 are indicated by the same numerals. The beat frequency selector 20 is connected to the video second detector 18 as shown in Figure 1. However, the filter 26 is tuned to pass the sound I. F. carrier and is therefore connected to the sound I. F. amplifier 8. The output of the filter 26 and of the frequency multiplier 22 are applied to a mixer 30. A discriminator 32 is connected to receive the frequency produced by the heterodyning action taking place in the mixer 30. It can be tuned to the sum or difference of the frequencies applied to it. If, for example, the frequency multiplier 22 is omitted, the discriminator 32 can be tuned to either the sum or the difference of the I. F. carrier used and the 4.5 beat frequency between them. In either case, the output of the discriminator 32 is applied to the reactance tube 28 so as to control the frequency of the local oscillator 26 in a manner well known to those skilled in the art.

Because the pass band of the video I. F. amplifier 16 is wider than the pass band of the sound I. F. amplifier 8, it is easier from a design point of view to permit some of the audio I. F. carrier to pass through the video I. F. amplifier 16 than it is to permit some of the video I. F. carriers to pass through the sound I. F. amplifier 8. For this reason, the beat frequency selector 20 is connected to the video second detector 18. However, it makes no difference as to which of the two I. F. carriers is applied to the mixer 30 and, therefore, the filter 26 may be connected as shown in Figure 1 to the video I. F. amplifier 16 or as shown in Figure 2 to the sound I. F. amplifier 8. Of course, the harmonic selected by the frequency multiplier 22 is changed depending on the I. F. carrier frequency selected by the filter 26.

Figure 3 illustrates a television receiver that is similar to the receiver of Figure 1 in that the video I. F. carrier is compared with a harmonic of the beat frequency between the sound and video I. F. carriers supplied by the video second detector 18. Corresponding components in Figures 1, 2 and 3 are indicated by similar numerals. The means for controlling the frequency of the local oscillator in accordance with the I. F. frequency selected and the beat frequency between the I. F. carriers comprises a mixer 30 and a discriminator 32, as illustrated in Figure 2.

Figure 4 illustrates the application of the principles of this invention to a television receiver of the intercarrier sound type such as described in the Parker patent U. S. 2,448,908 filed on July 13, 1944. In such a television receiver the video and audio R. F. carriers are supplied to a first detector 4 by a radio frequency amplifier 2. A local oscillator 6 is also coupled to the first detector 4 so as to provide two intermediate frequency carriers that are separated by 4½ mc. These carriers are amplified in a common I. F. amplifier 48 and are both detected by a second detector 50. The circuitry by which the video and audio signals are separated is generally indicated by a numeral 52. These circuitry details are amply discussed in the Parker patent noted above.

In accordance with this invention, either I. F. frequency may be selected by the filter 26 and supplied to a frequency comparison device 24. The manner in which the frequency comparison device 24 operates to control the frequency of the local oscillator in accordance with the beat frequency supplied by the beat frequency selector 20 has been amply explained in connection with Figure 1.

Figure 5 illustrates the use of a mixer 30 and a discriminator 32 as was discussed in connection with Figure 2 in combination with an intercarrier sound television receiver such as described in connection with Figure 4. Either I. F. frequency is selected by the filter 26 and applied to the mixer 30. The 4½ mc. beat frequency is selected by the beat frequency selector 20 and applied directly to the mixer 30, the frequency multiplier 22 being omitted. Therefore, the discriminator 32 may be tuned to the I. F. frequency selected by the filter 26 plus or minus 4½ mc.

Having thus described my invention, what is claimed is:

1. A receiver adapted to receive two carriers comprising in combination a first detector, a local oscillator connected to said first detector so as to produce a separate intermediate carrier for each of said carriers, means for deriving one of said intermediate carriers, means for deriving a beat frequency signal representing the frequency difference between said intermediate carriers, and means coupled with said carrier deriving means and said beat frequency signal deriving means for controlling the frequency of said local oscillator in response to the frequency relationship between said beat frequency signal and the frequency of said derived one of said intermediate carriers.

2. A receiver adapted to receive at least two carriers, the frequency difference between said carriers being substantially constant, a mixer to which said carriers are applied, a local oscillator, the output of said local oscillator also being applied to said mixer so that at least two intermediate carriers are produced, means for selecting one of said intermediate carriers, means for deriving a beat frequency signal representing the frequency difference between said carriers, a frequency comparison device to which electrical signal representations of said selected intermediate carrier and said beat frequency signal are applied, and means for controlling the frequency of said local oscillator in response to the output of said comparison device.

3. A receiver as described in claim 2 in which said frequency comparison device is a frequency discriminator.

4. A receiver comprising in combination a mixer to which received signals are applied, a local oscillator, the output of said local oscillator being applied to said mixer, a first intermediate frequency amplifier connected to receive the output of said mixer, a second intermediate frequency amplifier connected to receive the output of said mixer, said second intermediate frequency amplifier being adapted to permit the passage of a small amount of the intermediate frequency to which said first intermediate frequency amplifier is tuned, a detector connected so as to receive the output of said second intermediate frequency amplifier, a filter adapted to pass energy of the frequency to which said second intermediate frequency amplifier is tuned, said filter being coupled to said second intermediate frequency amplifier, a frequency multiplier tuned to a harmonic of the beat frequency between said intermediate carriers, said frequency multiplier being coupled to the output of said second detector, a frequency comparison device connected so as to receive the output of said filter and of said frequency multiplier, a reactance tube connected so as to control the frequency of said oscillator, said reactance tube being in turn controlled by the output of said frequency comparison device.

5. A receiver comprising in combination a source adapted to supply at least two carrier frequencies, a first detector to which said carrier frequencies are supplied, a local oscillator, the output of said local oscillator being coupled to said first detector so as to produce at least two intermediate carrier frequencies, an intermediate frequency amplifier connected to the output of said first detector, said intermediate frequency amplifier being adapted to pass at least some energy of two of the intermediate frequencies supplied by said first detector, a detector coupled to the output of said intermediate frequency amplifier, a filter adapted to pass one of said intermediate carrier frequencies, said filter being coupled to said intermediate frequency amplifier, a mixer connected to receive the output of said filter, a beat frequency selector coupled between said detector and said mixer, a frequency discriminator connected to the output of said mixer, and a reactance tube coupled to said oscillator, said reactance tube being controlled by the output of said mixer.

References Cited in the file of this patent

UNITED STATES PATENTS

| Number | Name | Date |
|---|---|---|
| 2,403,385 | Loughlin | July 2, 1946 |
| 2,448,908 | Parker | Sept. 7, 1948 |
| 2,504,663 | Dome | Apr. 18, 1950 |
| 2,553,368 | Green | May 15, 1951 |